(12) United States Patent
Hatakeyama et al.

(10) Patent No.: US 10,369,957 B2
(45) Date of Patent: Aug. 6, 2019

(54) SIDE AIRBAG DEVICE AND AIRBAG IN SIDE AIRBAG DEVICE

(71) Applicants: Naoki Hatakeyama, Yokohama (JP); Keita Eguchi, Yokohama (JP); Yuto Kobayashi, Yokohama (JP)

(72) Inventors: Naoki Hatakeyama, Yokohama (JP); Keita Eguchi, Yokohama (JP); Yuto Kobayashi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 54 days.

(21) Appl. No.: 15/505,766

(22) PCT Filed: Jul. 28, 2015

(86) PCT No.: PCT/JP2015/071301
§ 371 (c)(1),
(2) Date: Feb. 22, 2017

(87) PCT Pub. No.: WO2016/031468
PCT Pub. Date: Mar. 3, 2016

(65) Prior Publication Data
US 2017/0274861 A1 Sep. 28, 2017

(30) Foreign Application Priority Data
Aug. 26, 2014 (JP) ................. 2014-171572

(51) Int. Cl.
- B60R 21/237 (2006.01)
- B60R 21/207 (2006.01)
- B60R 21/231 (2011.01)

(52) U.S. Cl.
CPC .......... B60R 21/237 (2013.01); B60R 21/207 (2013.01); B60R 21/23138 (2013.01); *B60R 2021/23146* (2013.01)

(58) Field of Classification Search
CPC ............ B60R 21/207; B60R 21/23138; B60R 21/237
See application file for complete search history.

(56) References Cited

U.S. PATENT DOCUMENTS 5,240,282 A * 8/1993 Wehner ................. B60R 21/201
280/728.1
5,899,490 A * 5/1999 Wipasuramonton ........................
B60R 21/237
280/730.2
(Continued)

FOREIGN PATENT DOCUMENTS

CN 102145679 A 8/2011
CN 103303244 A 9/2013
(Continued)

OTHER PUBLICATIONS

PCT International Search Report —dated Oct. 6, 2015.

*Primary Examiner* — Nicole T Verley
(74) *Attorney, Agent, or Firm* — Brinks Gilson & Lione

(57) ABSTRACT

A side airbag for enhancing protection of a shoulder area of a vehicle occupant having an airbag (10) which deploys beside an occupant toward the vehicle front, and an inflator (20). Before deploying, the airbag (10) is in a state having: an overlapping part (12) formed by overlapping a portion near an end part by accordion-folding or rolling; a folded-back part (14) on an inner side of the overlapping part (12) in a vehicle width direction and extended toward the front of the vehicle and folded back toward the rear of the vehicle; and a bent part (16) formed by bending a portion of the folded-back part (14), protruding from the overlapping part (12) toward the front of the vehicle toward an outer side in the vehicle width direction and covering at least part of the overlapping part (12).

11 Claims, 20 Drawing Sheets

(56) References Cited

U.S. PATENT DOCUMENTS

| | | | |
|---|---|---|---|
| 5,927,750 A | 7/1999 | Nakamura et al. | |
| 6,142,507 A * | 11/2000 | Okuda | B60R 21/23138 280/730.2 |
| 6,142,517 A * | 11/2000 | Nakamura | B60R 21/23138 280/739 |
| 6,231,070 B1 * | 5/2001 | Sunabashiri | B60R 21/237 280/730.2 |
| 7,004,501 B2 * | 2/2006 | Schneider | B60R 21/237 280/743.1 |
| 7,445,239 B2 * | 11/2008 | Okada | B60R 21/237 280/743.1 |
| 7,793,975 B2 * | 9/2010 | Fukawatase | B60R 21/237 280/730.1 |
| 7,926,844 B2 * | 4/2011 | Williams | B60R 21/237 280/732 |
| 8,136,837 B2 * | 3/2012 | Feller | B60R 21/237 280/743.1 |
| 8,152,197 B2 * | 4/2012 | Taguchi | B60R 21/207 280/728.2 |
| 8,360,466 B2 * | 1/2013 | Kino | B60R 21/231 280/730.2 |
| 8,608,195 B2 * | 12/2013 | Yamada | B60R 21/201 280/732 |
| 8,714,587 B2 * | 5/2014 | Nakamura | B60R 21/213 280/730.2 |
| 8,777,262 B2 * | 7/2014 | Enders | B60R 21/201 280/728.2 |
| 9,090,223 B2 * | 7/2015 | Baumbach | B60R 21/213 |
| 9,238,446 B2 * | 1/2016 | Azuma | B60R 21/237 |
| 9,333,932 B2 * | 5/2016 | Sakai | B60R 21/205 |
| 9,656,625 B2 * | 5/2017 | Jung | B60R 21/206 |
| 9,789,841 B2 * | 10/2017 | Fujiwara | B60R 21/2346 |
| 9,975,519 B2 * | 5/2018 | Kobayashi | B60N 2/42 |
| 10,017,148 B2 * | 7/2018 | Hayashi | B60R 21/237 |
| 2011/0193327 A1 | 8/2011 | Tracht et al. | |
| 2012/0038135 A1 * | 2/2012 | Oomori | B60R 21/23138 280/730.2 |
| 2013/0076013 A1 | 3/2013 | Shibayama et al. | |
| 2013/0234421 A1 | 9/2013 | Honda et al. | |

FOREIGN PATENT DOCUMENTS

| | | | |
|---|---|---|---|
| DE | 197 14 267 A1 | 11/1997 | |
| DE | 10 2010 001 772 A1 | 8/2011 | |
| DE | 102008048277 B4 * | 12/2016 | B60R 21/205 |
| EP | 2 636 563 A1 | 11/2013 | |
| JP | 09-272393 | 10/1997 | |
| JP | 2004-203272 | 7/2004 | |
| JP | 2007-126821 | 8/2007 | |
| JP | 2013-82435 | 5/2013 | |
| JP | 2013-184647 | 9/2013 | |
| KR | 100255785 | 2/2000 | |
| WO | WO-2018105335 A1 * | 6/2018 | |

* cited by examiner

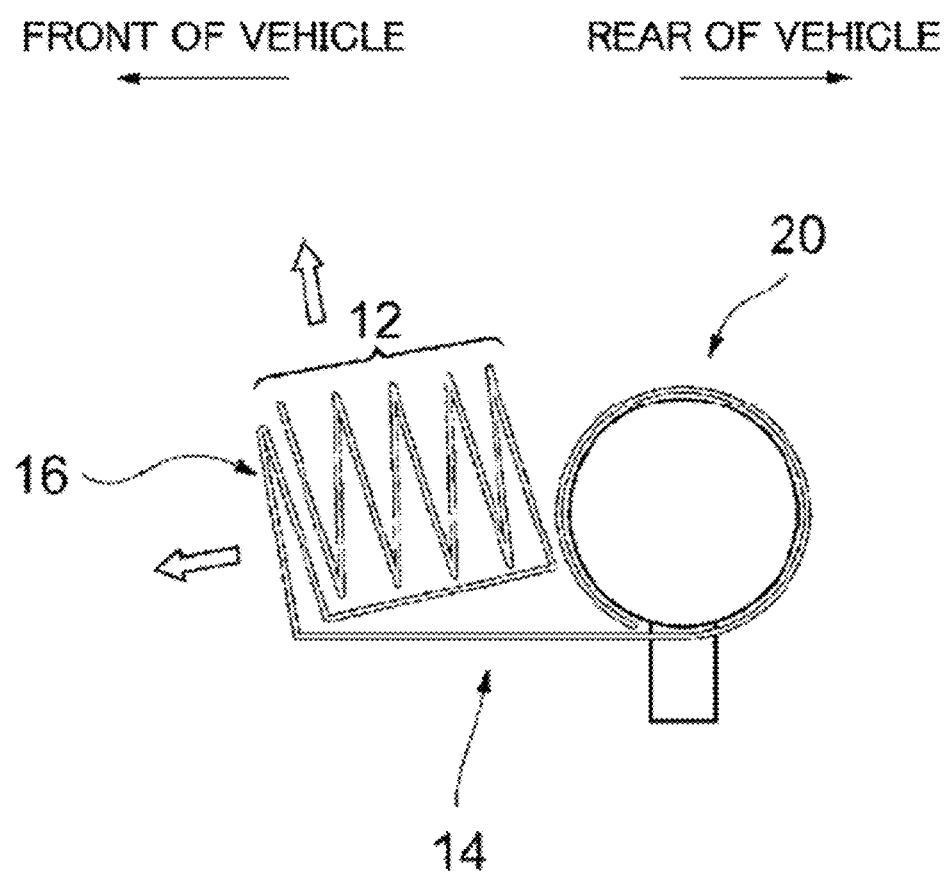

SIDE AIRBAG DEVICE AND AIRBAG IN SIDE AIRBAG DEVICE

CROSS REFERENCE TO RELATED APPLICATIONS

This application claims priority to Japanese Patent Application No. 2014-171572, filed on Aug. 26, 2014 and PCT/JP2015/071301, filed on Jul. 28, 2015.

FIELD OF THE INVENTION

The present invention relates to a side airbag device and an airbag in the side airbag device. More specifically, the present invention relates to an improvement in a configuration of an airbag of a side airbag device mounted to a motor vehicle.

BACKGROUND

Side airbag devices are used which, during a side collision of a vehicle or the like, expands an airbag beside an occupant sitting in a seat and deploys the airbag toward the front of the vehicle.

Such side airbag devices include a proposed side airbag device which is designed to improve deployment characteristics of a side airbag by providing a roll-shaped gathering part and a guiding part positioned along both sides of the gathering part when folding the airbag (for example, refer to Japanese Patent Application Laid-open No. 2004-203272).

In addition, a side airbag device is proposed in which, in order to avoid a situation where an airbag rear part and an airbag front part do not deploy and expand appropriately during deployment of an airbag, a partition which divides the airbag into a rear chamber and a front chamber is provided with a communication path which communicates both chambers (for example, refer to Japanese Patent Application Laid-open No. 2013-82435).

SUMMARY AND INTRODUCTORY DESCRIPTION OF THE INVENTION

However, conventional airbag devices such as those described above include airbag devices of which a behavior during airbag deployment may not be optimal. In particular, compared to an airbag device installed in a steering wheel or a dashboard, a side airbag device which mitigates impact to a side part of an occupant is required to deploy quickly and reliably due to a narrow space between the occupant and a vehicle side part (a door, a pillar, or the like). However, in reality, an airbag may sometimes get under an arm of an occupant during deployment and, as a result, a vicinity of a shoulder of the occupant may not be sufficiently protected.

In consideration of the above, an object of the present invention is to provide a side airbag device which enables a vicinity of a shoulder or the like of an occupant to be more reliably protected and an airbag in the side airbag device.

In order to achieve the object described above, the present invention provides an airbag in a side airbag device including the airbag which expands beside an occupant sitting in a seat of a vehicle and which deploys toward the front of the vehicle, and an inflator which supplies expansion gas from a base part of the airbag toward an end part of the airbag, wherein before expanding and deploying, the airbag is in a state where the airbag includes:

an overlapping part formed by overlapping a portion near the end part by accordion-folding or winding or by a combination of folding and winding;

a folded-back part which is a portion continuing from the overlapping part to the base part and near the base part and which is formed at a position on an inner side of the overlapping part in a vehicle width direction by being extended toward the front of the vehicle and subsequently folded back toward the rear of the vehicle; and a bent part which is formed by bending a portion, of the folded-back part, protruding from the overlapping part toward the front of the vehicle toward an outer side in the vehicle width direction, and which covers at least a part of the overlapping part on a vehicle front side of the overlapping part.

According to the present invention, during deployment of the airbag, when the bent part moves in a direction opposite to a direction in which the bent part is bent or, in other words, toward an inner side in the vehicle width direction, the bent part imparts a force which causes movement toward a vehicle outer side to the overlapping part. As a result, the airbag itself become more readily deployable toward the outer side in the vehicle width direction. Therefore, since the airbag behaves so as to deploy toward an outer side of an arm of an occupant, the airbag more readily penetrates a gap between a vicinity of a shoulder and a door and more readily creates a state where the vicinity of the shoulder or the like of the occupant can be more reliably protected.

Favorably, in the airbag, the overlapping part is formed by being folded or wound from obliquely above with respect to a longitudinal direction of the inflator having a prescribed length in a vertical direction. Since such an airbag deploys while expanding obliquely upward, the airbag can penetrate a gap between the vicinity of a shoulder and a door while flipping an arm of the occupant obliquely upward during deployment.

The airbag may be in a state where the overlapping part, the folded-back part, and the bent part are formed after an upper portion and a lower portion of the airbag in the vertical direction are obliquely folded.

In addition, the airbag may be in a state where the overlapping part, the folded-back part, and the bent part are formed after the upper portion and the lower portion of the airbag in the vertical direction are folded obliquely upward and assume a shape having an upper edge and a lower edge which are parallel to each other.

Furthermore, the lower portion may be in a state of being tucked in and folded back at the lower edge.

In the airbag, the overlapping part may be configured by a roll part formed by winding the portion near the end part, and a second folded-back part may be formed between the roll part and the folded-back part and arranged on a vehicle rear side of the roll part. The second folded-back part formed in this manner assists quick deployment of a lower portion of the airbag while pushing the roll part toward the front of the vehicle during deployment of the airbag. In other words, when the overlapping part is pushed toward the front of the vehicle by the second folded-back part, since the lower portion of the airbag which is folded back upward from the lower edge becomes more readily deployable downward from the lower edge, the lower portion of the airbag becomes quickly deployable.

The second folded-back part is formed by being extended toward the outer side in the vehicle width direction and subsequently folded back toward the inner side in the vehicle width direction.

In addition, a side airbag device according to the present invention includes the airbag described above.

Furthermore, the present invention provides a side airbag device including an airbag which expands and deploys beside an occupant sitting in a seat of a vehicle toward the front of the vehicle, and an inflator which supplies expansion gas from a base part of the airbag toward an end part of the airbag, wherein the airbag in a state before expanding and deploying includes:

an overlapping part formed by accordion-folding a portion near the end part;

a folded-back part which is a portion continuing from the overlapping part to the base part and near the base part and which is formed on an inner side of the folded part in a vehicle width direction by being extended toward the front of the vehicle and subsequently folded back toward the rear of the vehicle; and a bent part which is formed by bending a portion, of the folded-back part, protruding from the overlapping part toward the front of the vehicle toward a vehicle outer side, and which covers at least a part of the overlapping part on a vehicle front side of the overlapping part.

According to the present invention, a vicinity of a shoulder or the like of an occupant can be more reliably protected.

BRIEF DESCRIPTION OF THE DRAWINGS

FIG. 10 is a plan view of an airbag showing actions of forces and movements of respective parts upon expansion and deployment.

DETAILED DESCRIPTION OF THE INVENTION

Figure 1:
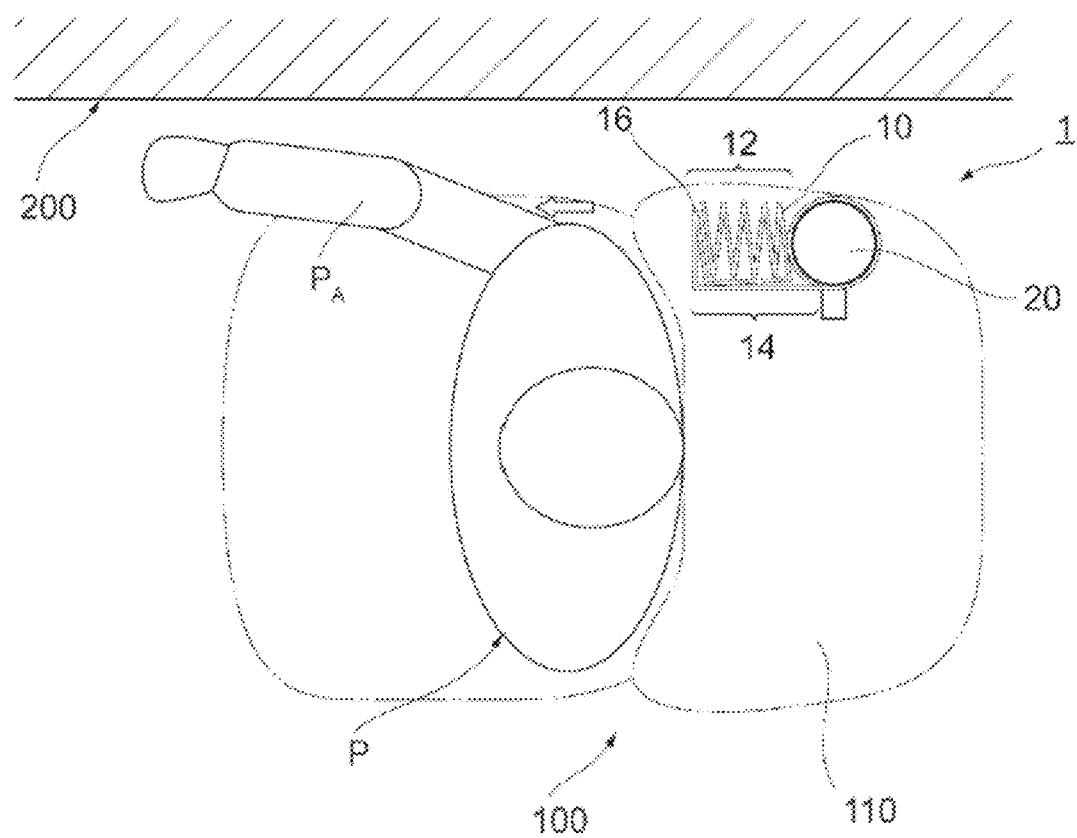
FIG. 1 is a plan view of a vicinity of a seat of a vehicle showing an example of a side airbag device.

Hereinafter, a configuration of the present invention will be described based on an example of an embodiment illustrated in the drawings.

A side airbag device 1 according to the present invention includes an airbag 10 and an inflator 20 and is provided in a back part 110 of a seat 100 of an automobile so as to expand and deploy between an occupant P and a vehicle side part (for example, a door 200) during a side collision or the like. It should be noted that, while a description will be hereinafter given using the side airbag device 1 for a right seat (refer to FIG. 1 and the like) as an example, it is needless to say that the side airbag device 1 can also be applied to a left seat.

The airbag 10 is provided so as to expand beside the occupant P sitting in the seat 100 of the vehicle and deploy toward the front of the vehicle. The airbag 10 in the side airbag device 1 according to the present embodiment is in a housed state where the airbag 10 is folded as described below. Hereinafter, the airbag 10 will be described while showing a folding method step by step.

Figure 2:
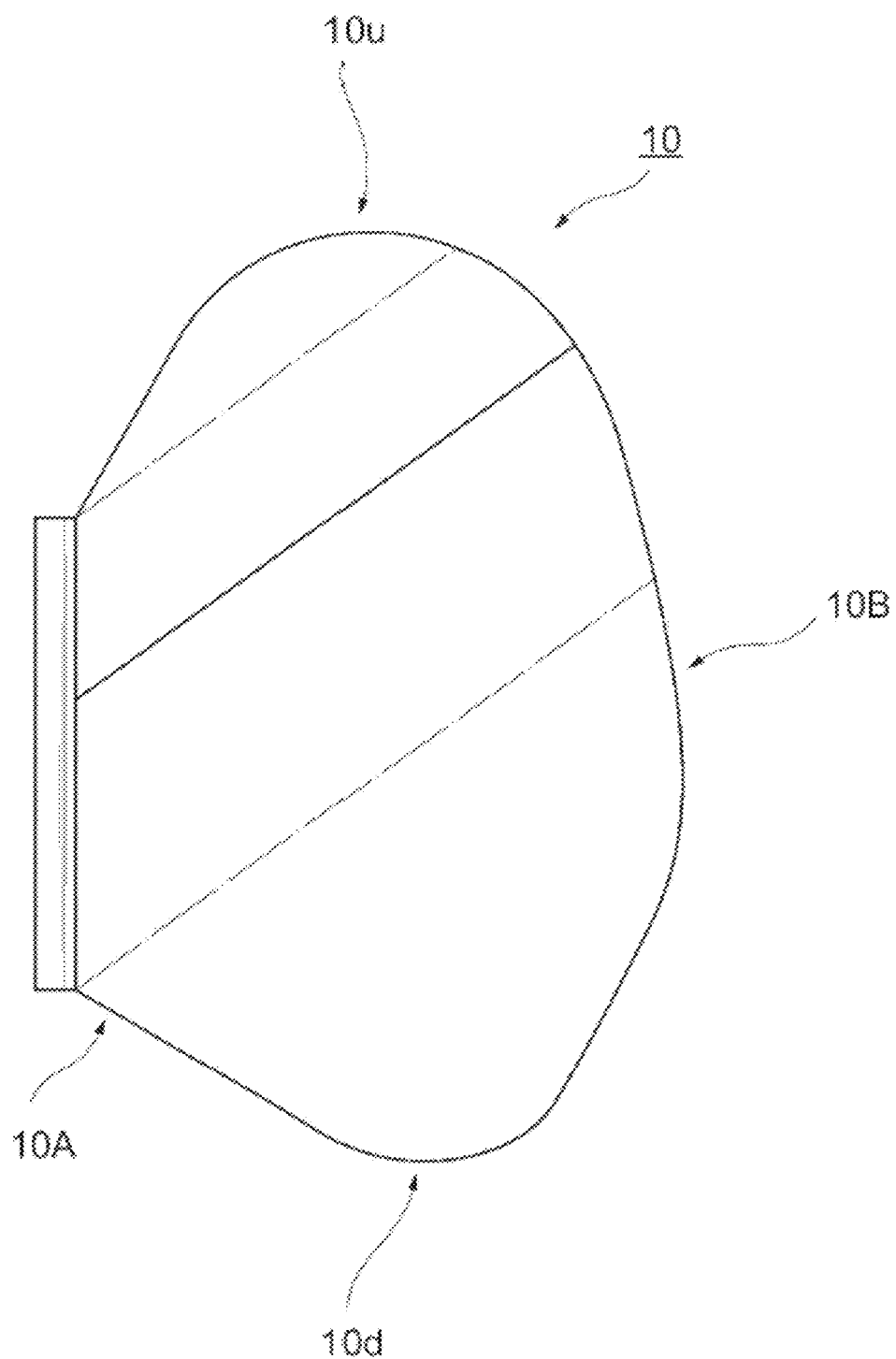
FIG. 2 is a diagram showing an airbag before being folded.

First, in the airbag 10 before being folded, a side attached to the inflator 20 will be referred to as a base part 10A and an opposite side to the base part 10A or, in other words, a side to face the front of the vehicle during deployment will be referred to as an end part 10B (refer to FIG. 2). The airbag 10 is supplied with expansion gas by the inflator 20 from the base part 10A toward the end part 10B.

The inflator 20 supplies the expansion gas from the base part 10A of the airbag 10 toward the end part 10B of the airbag 10. The inflator 20 according to the present embodiment is formed in, for example, a cylindrical shape having a prescribed length and is installed inside the back part 110 of the seat 100 in a state where a longitudinal direction is oriented vertically.

In addition, the airbag 10 of which a side of the base part 10A is attached to the inflator 20 is installed in the seat 100 such that, in FIG. 2, an upper portion is positioned in an upper part in a vertical direction and a lower portion is positioned in a lower part in the vertical direction. Moreover, for convenience's sake, hereinafter, the upper portion of the airbag 10 will be denoted by a reference sign 10u and the lower portion of the airbag 10 will be denoted by a reference sign 10d (refer to FIG. 2 and the like).

Figure 3:
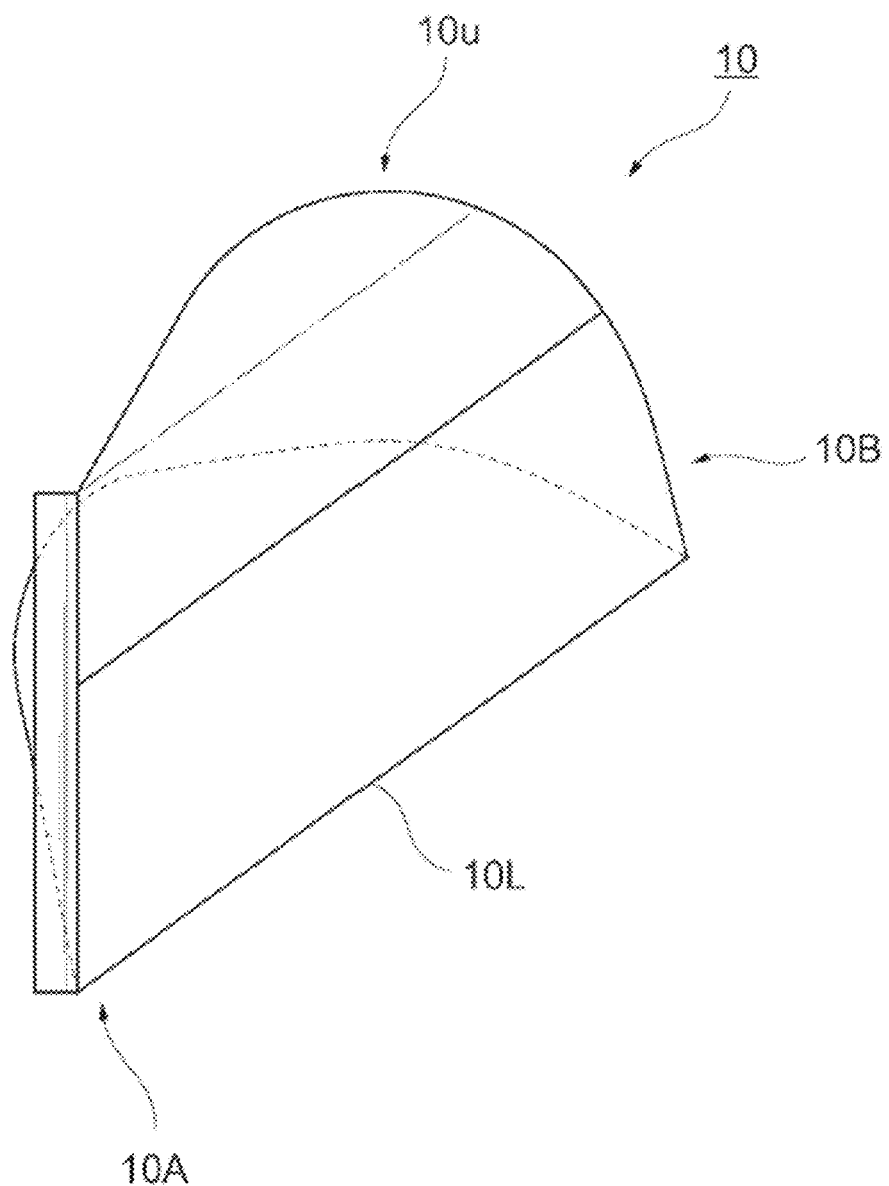
FIG. 3 is a diagram showing an airbag in a state where a lower portion is folded back upward.
Figure 4:
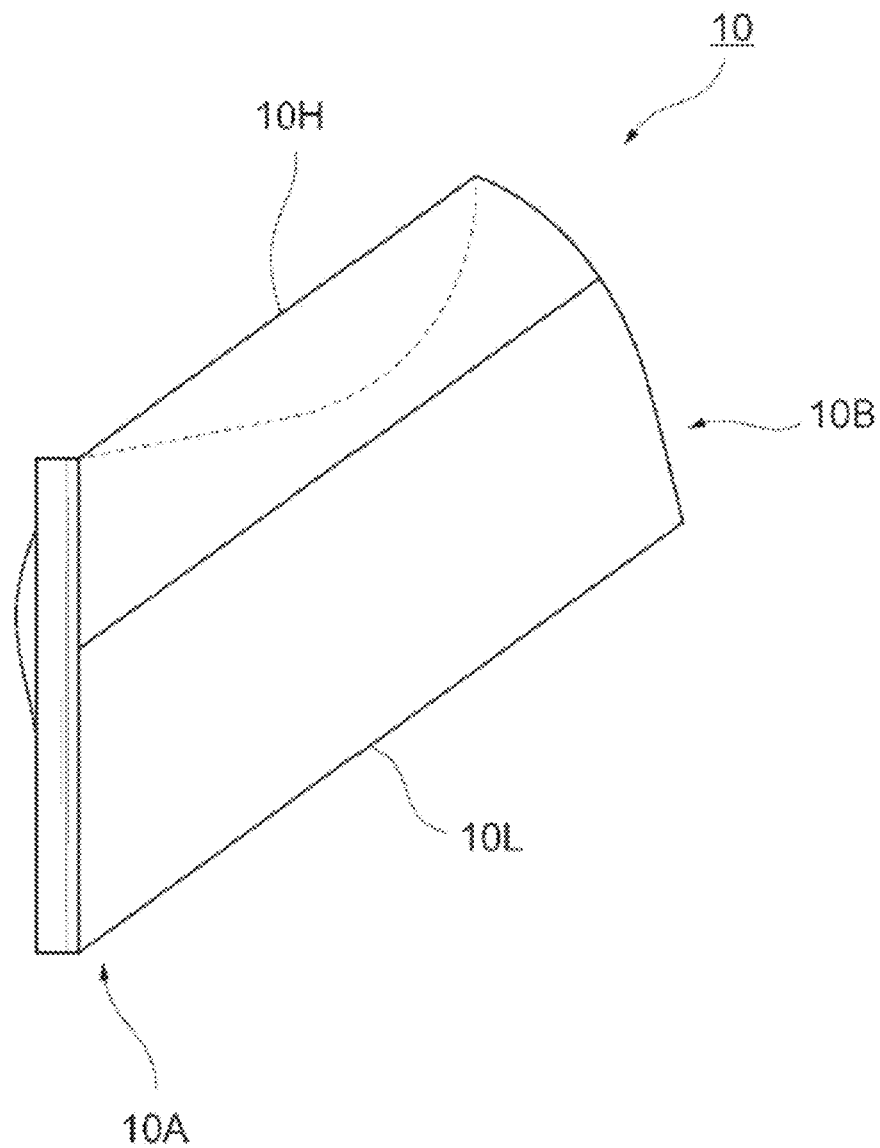
FIG. 4 is a diagram showing an airbag in a state where, further, an upper portion is folded back downward.

In the present embodiment, the lower portion 10d of the airbag 10 is folded back upward (refer to FIG. 3) and, further, the upper portion 10u is folded back downward (refer to FIG. 4). Conversely, the upper portion 10u may be folded back first.

At this point, in the present embodiment, the upper portion 10u and the lower portion 10d are folded back obliquely and given a shape having an upper edge 10H and a lower edge 10L which are parallel to each other (including cases where the edges are approximately parallel to each other).

Furthermore, in this case, the lower portion 10d is favorably obliquely folded back so that the end part 10B is positioned above the base part 10A (refer to FIG. 4). In such a case, the airbag 10 after the upper portion 10u and the lower portion 10d are folded back assumes a shape which is inclined so as to extend obliquely upward with respect to a longitudinal direction of the inflator 20 having a prescribed length in the vertical direction.

Figure 5:
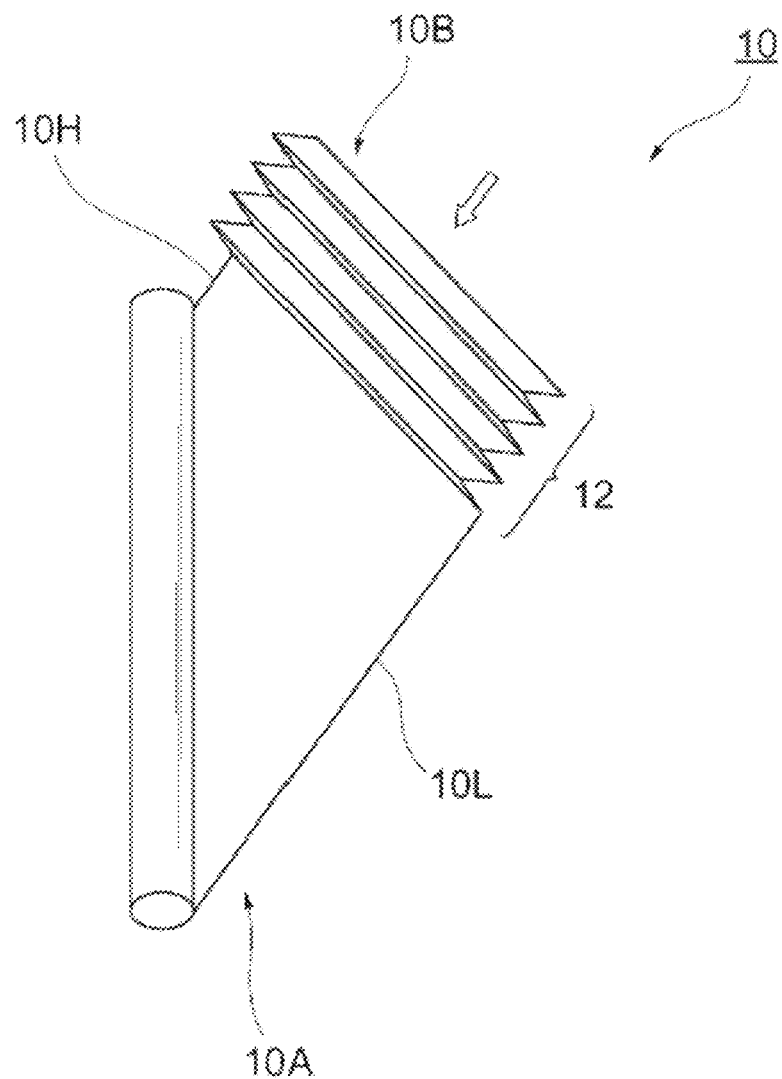
FIG. 5 is a diagram showing an airbag in a state where a portion near an end part is overlapped by being accordion-folded.
Figure 9A:
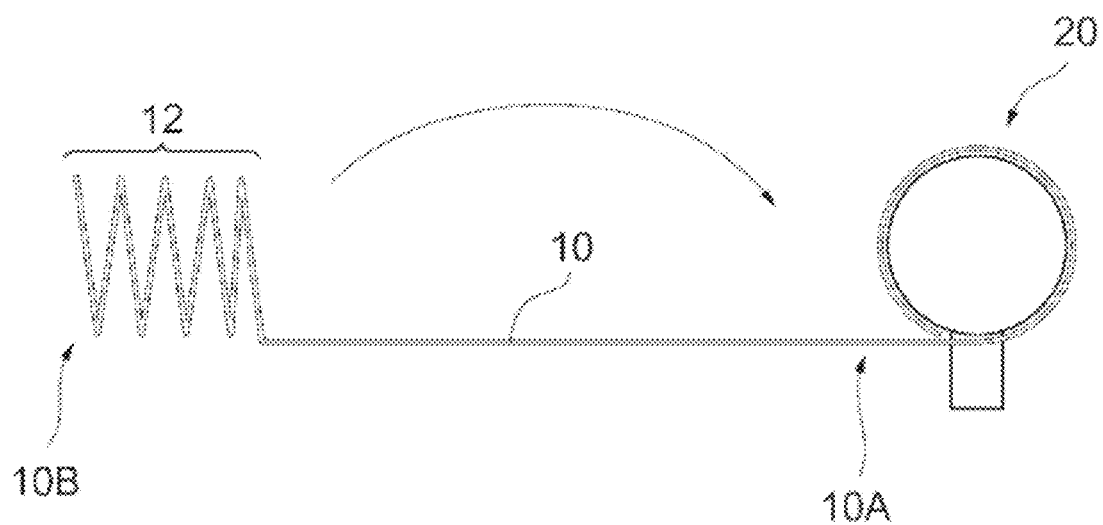
FIG. 9A is a plan view of an airbag in a state where an overlapping part is formed.

Next, a portion near the end part 10B in the airbag 10 is accordion-folded and overlapped to form an overlapping part 12 (refer to FIGS. 5 and 9A). In the overlapping part 12, the airbag 10 is in a state of being folded right, left, right, . . . in a zigzag manner or like an accordion.

When a part of the airbag 10 is accordion-folded in this manner, the part of the airbag 10 is favorably folded from obliquely above with respect to the longitudinal direction of the inflator 20 toward the inflator 20 (refer to FIGS. 4 and 5). Since the airbag 10 folded in such a manner deploys obliquely upward during expansion, the airbag 10 more readily penetrates a gap between the vicinity of a shoulder and a door while flipping an arm (refer to reference sign $P_A$ in FIG. 1) of the occupant P obliquely upward during deployment.

Figure 9B:
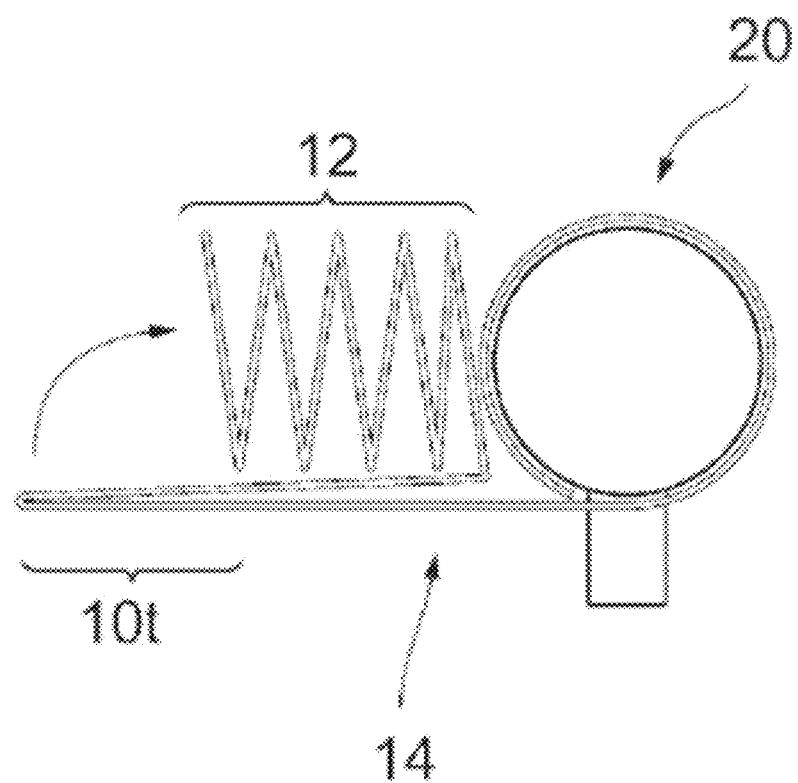
FIG. 9B is a plan view of an airbag in a state where a folded-back part is formed.

Next, a portion continuing from the overlapping part 12 to the base part 10A (a portion near the base part 10A in the airbag 10) is placed in a state of being extended toward the front of the vehicle and subsequently folded back toward the rear of the vehicle at a position on an inner side in the vehicle width direction of the overlapping part 12 to form a folded-back part 14 (refer to FIG. 9B). At this point, the overlapping part 12 is positioned on an outer side in the vehicle width direction of the folded-back part 14 (near the door 200) and in the vehicle front direction of the inflator 20 (refer to FIG. 9B).

Figure 6:
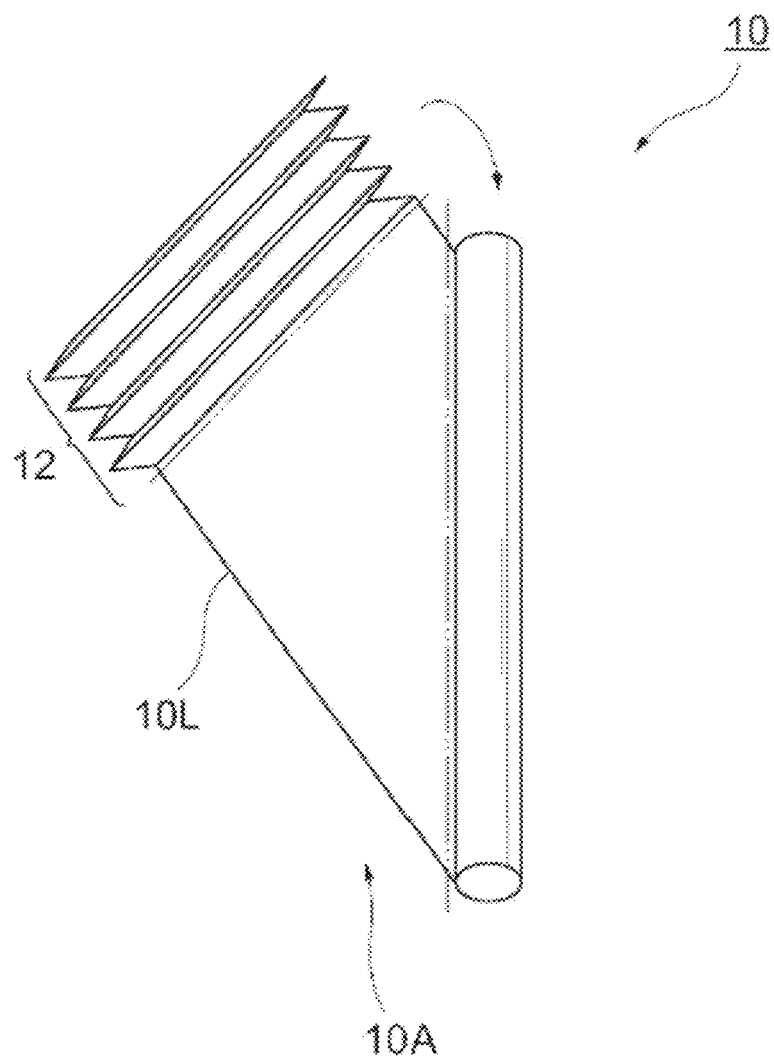
FIG. 6 is a diagram showing a state where an entirety of the airbag shown in FIG. 5 is flipped over so that left and right are reversed.
Figure 7:
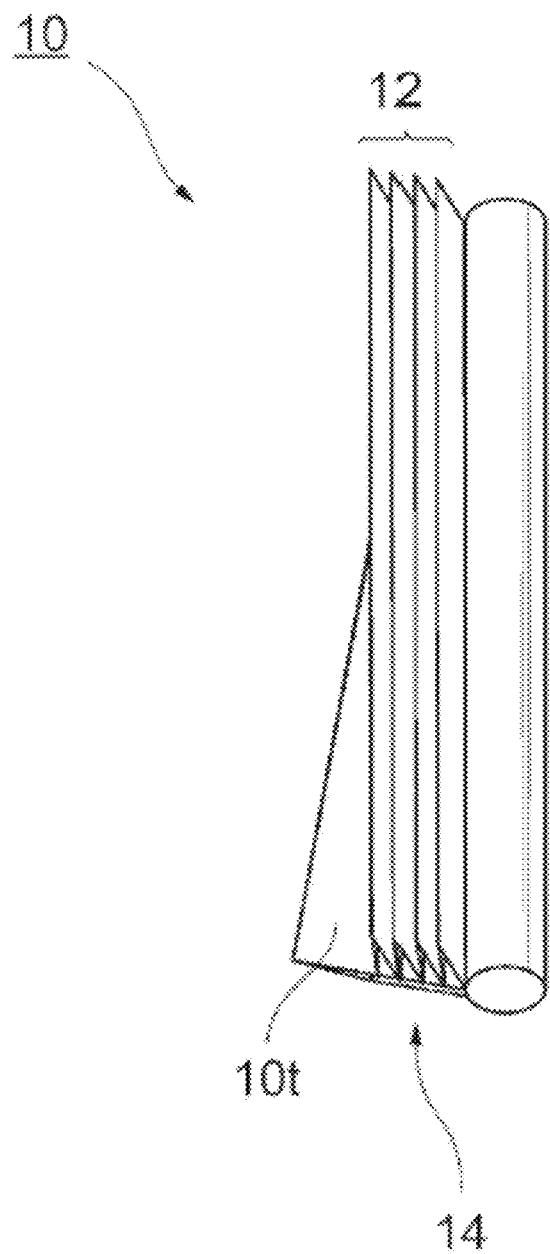
FIG. 7 is a diagram showing an airbag in a state where a folded-back part is formed by moving an overlapping part.

An example of a folding method for forming the folded-back part 14 will now be shown. After forming the overlapping part 12 (refer to FIG. 5) by accordion-folding a portion near the right-side end part 10B in the airbag 10 shown in FIG. 5, an entirety of the overlapping part 12 is flipped over so that left and right are reversed (refer to FIG. 6). Next, the overlapping part 12 is lifted by a plucking motion and moved so that, in FIG. 6, a portion depicted by a dashed-dotted line overlaps with a portion depicted by a dashed-two dotted line. The overlapping portion at this point constitutes the folded-back part 14 (refer to FIG. 9B). In addition, a part of the folded-back part 14 becomes in a state of protruding in a triangular shape toward the left in the drawing (in other words, toward the front of the vehicle) from the overlapping part 12 (refer to FIG. 7). This protruding portion 10t has a shape similar to or approximating a triangular-shaped portion defined by the dashed-dotted line and the dashed-two dotted line in FIG. 6.

Figure 8:
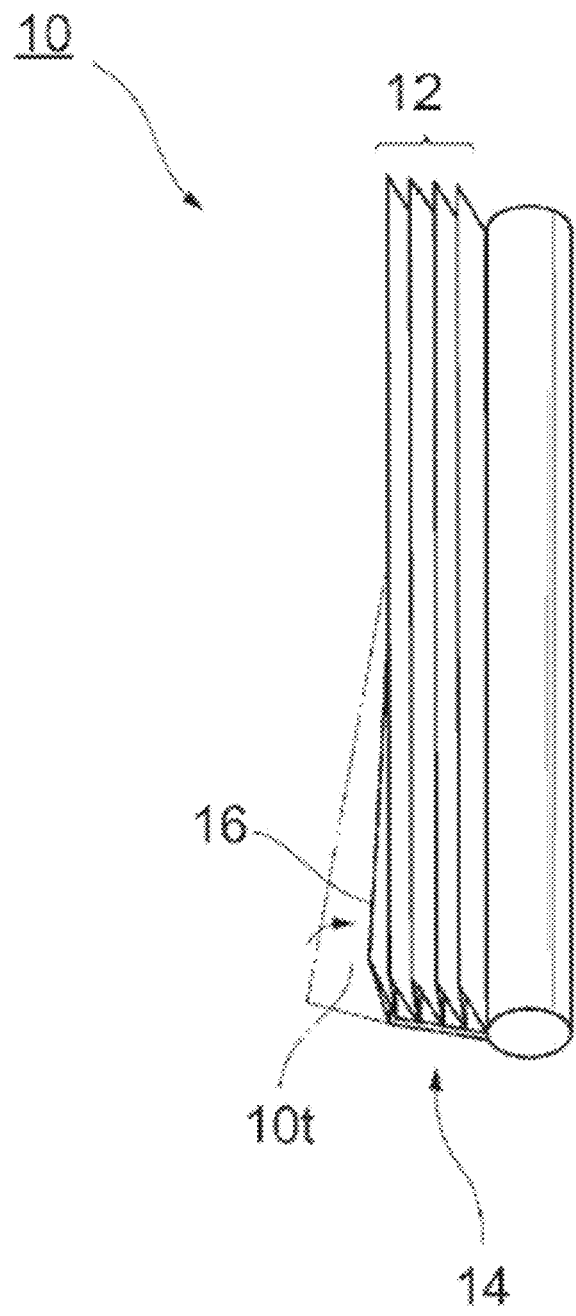
FIG. 8 is a diagram showing an airbag in a state where a bent part is formed by bending a portion protruding from an overlapping part.
Figure 9C:
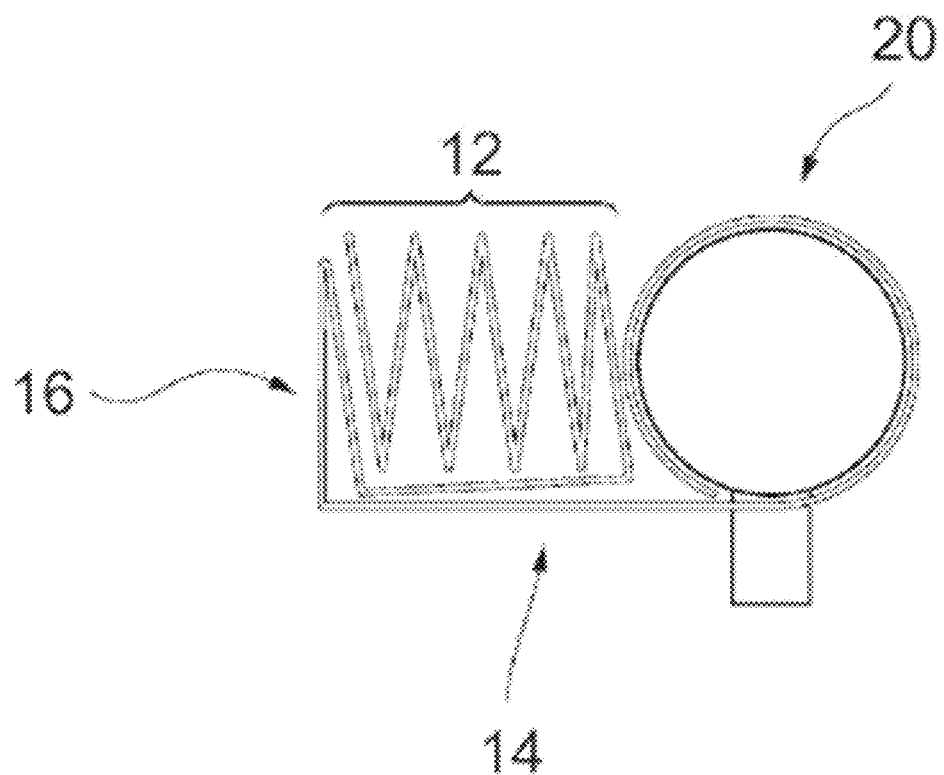
FIG. 9C is a plan view of an airbag in a state where a bent part is formed.

Next, the portion 10t protruding in a triangular shape is bent toward the outer side in the vehicle width direction to form a bent part 16 (refer to FIGS. 8 and 9C). As illustrated, the bent part 16 assumes a state where the bent part 16 covers at least a part of the overlapping part 12 in the front of the vehicle with respect to the overlapping part 12 (refer to FIG. 8 and the like).

The airbag 10 folded as described above and in which, before expansion and deployment, the overlapping part 12, the folded-back part 14, the bent part 16, and the like described above are formed expands and deploys as described below (refer to FIG. 10 and the like).

Figure 11:
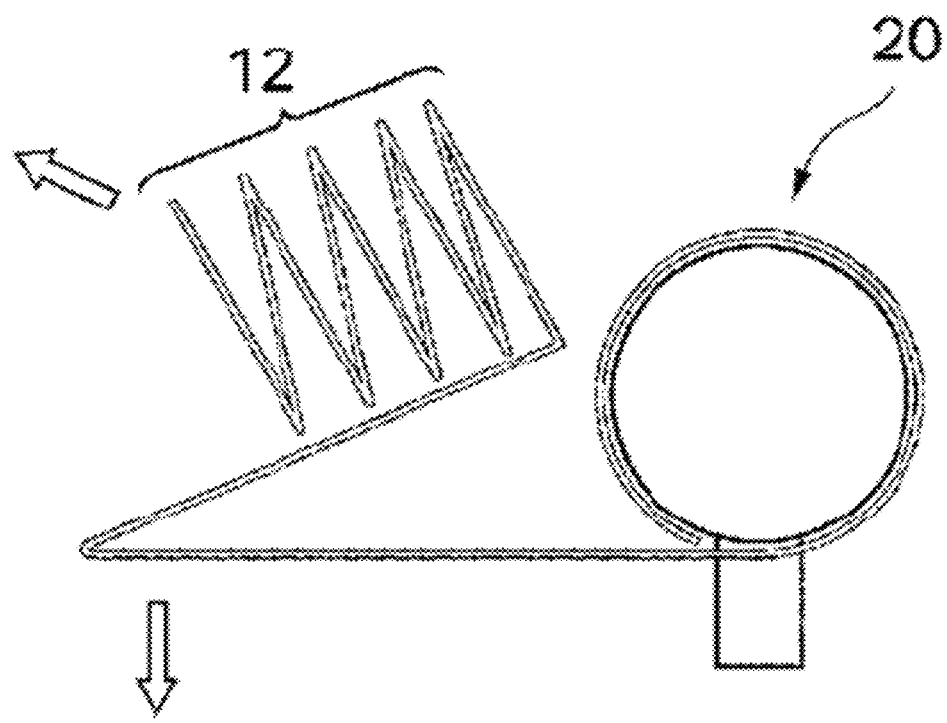
FIG. 11 is a plan view of an airbag showing actions of forces and movements of respective parts during expansion and deployment.
Figure 17:
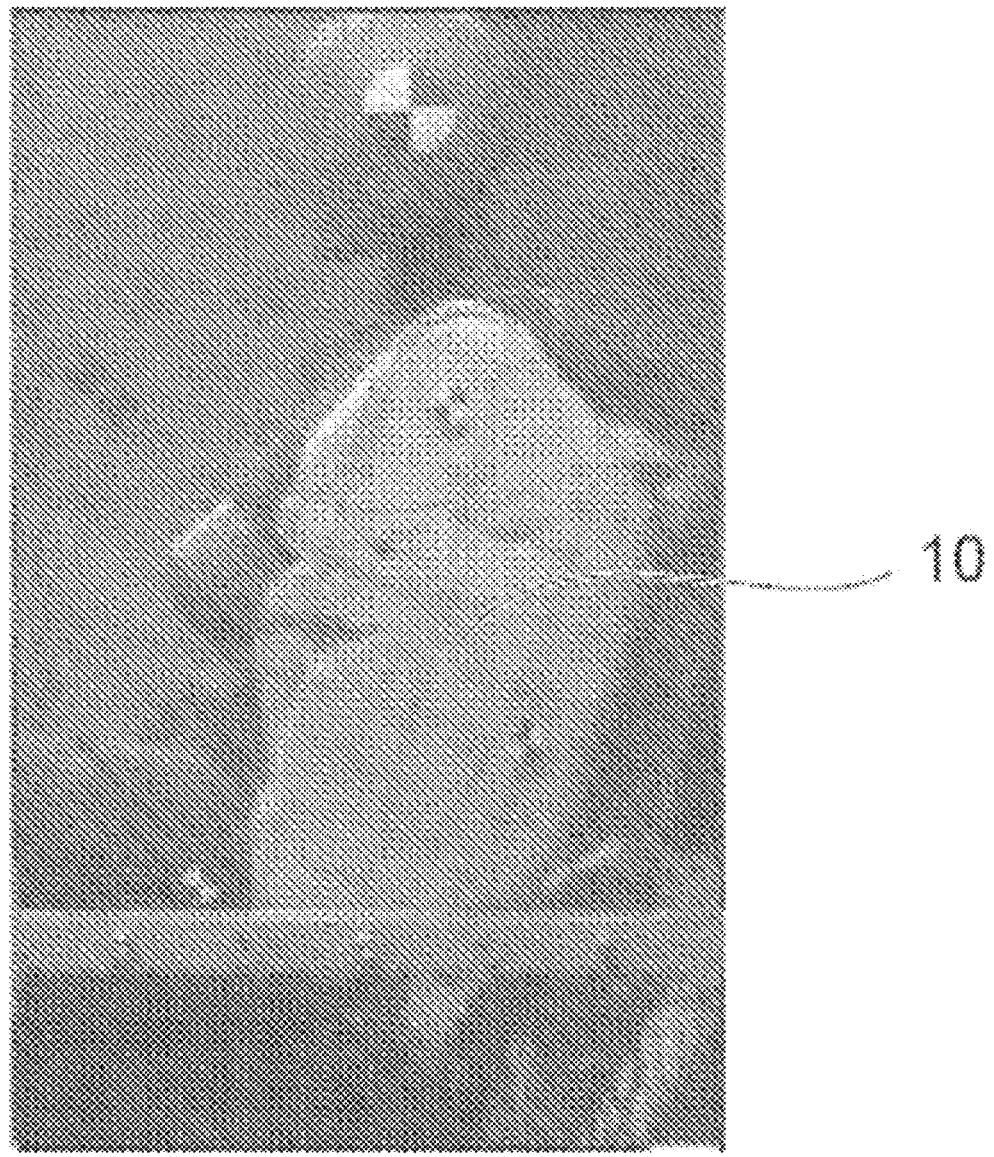
FIG. 17 is an image showing a situation where a demonstration experiment involving expanding and deploying an airbag of a side airbag device is performed.

Specifically, when expanding and deploying, the released bent part 16 moves toward the inner side in the vehicle width direction which is opposite to the bent direction in an attempt to straighten itself. At this point, the bent part 16 moving with inertia and momentum imparts a force oriented toward the outer side in the vehicle width direction through the folded-back part 14 to the overlapping part 12 having just been released in a similar manner (refer to FIG. 11). Normally, the overlapping part 12 moves so as to be pushed forward while becoming undone during expansion and deployment. However, in the side airbag device 1 according to the present embodiment, a force oriented toward the outer side is further applied. As a result, the entire airbag 10 becomes more readily deployable toward the outer side in the vehicle width direction. Therefore, since the airbag 10 operates so as to deploy to the outer side of an arm of the occupant P, the airbag 10 can penetrate a gap between the vicinity of a shoulder of the occupant P and the door 200 without being inhibited by the arm of the occupant P and the like. Alternatively, even when the airbag 10 collides with an arm of the occupant P, the airbag 10 is able to penetrate the gap between the vicinity of a shoulder of the occupant P and the door 200 by flipping up the arm. Therefore, a state where the vicinity of a shoulder or the like of the occupant P can be more reliably protected is more readily formed (FIG. 17).

In addition, according to the side airbag device 1, since the airbag 10 is operated toward the outer side of the arm of the occupant P, the folded airbag 10 can be unfolded faster. Therefore, gas can be fed closer to a tip (in other words, a side of the end part 10B) of the airbag 10 in an early stage of deployment.

Furthermore, in the side airbag device 1, since a part of the airbag 10 is folded in a state of being overlapped in an accordion pattern or a roll shape, the airbag 10 assumes an extremely compact state before expansion and deployment.

Figure 12:
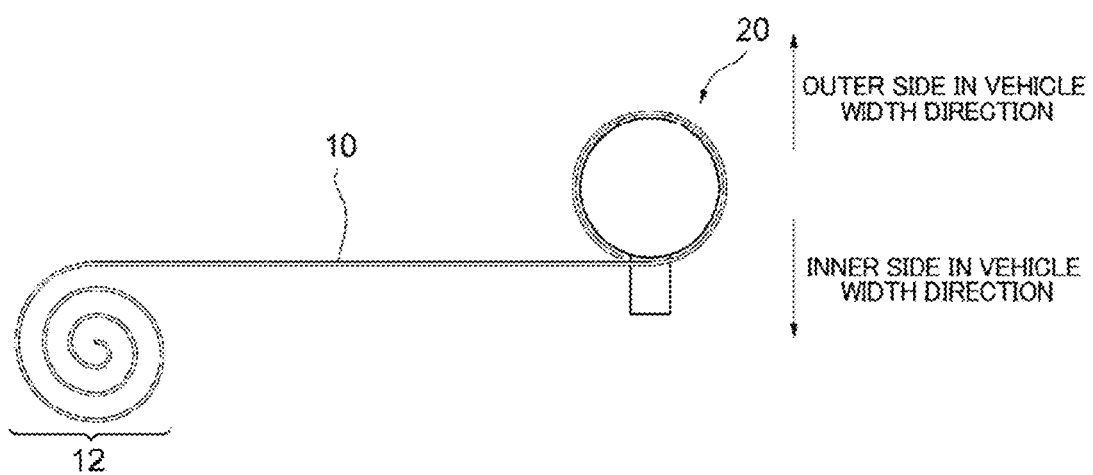
FIG. 12 is a plan view of an airbag in a state where a roll-shaped overlapping part is formed.
Figure 13:
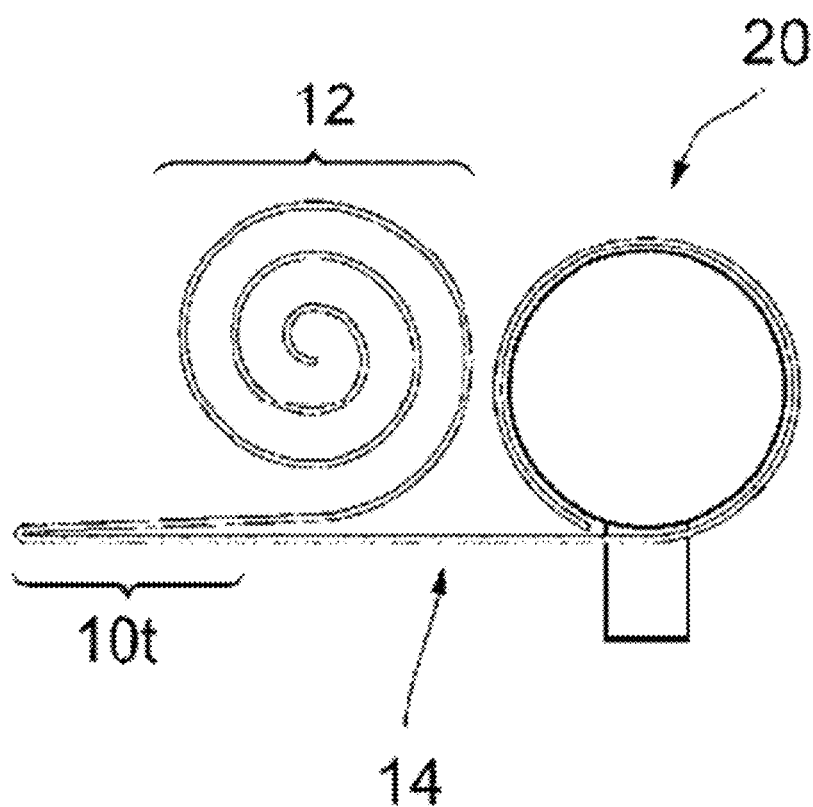
FIG. 13 is a plan view of an airbag in a state where a folded-back part is formed after a roll-shaped overlapping part is formed.
Figure 14:
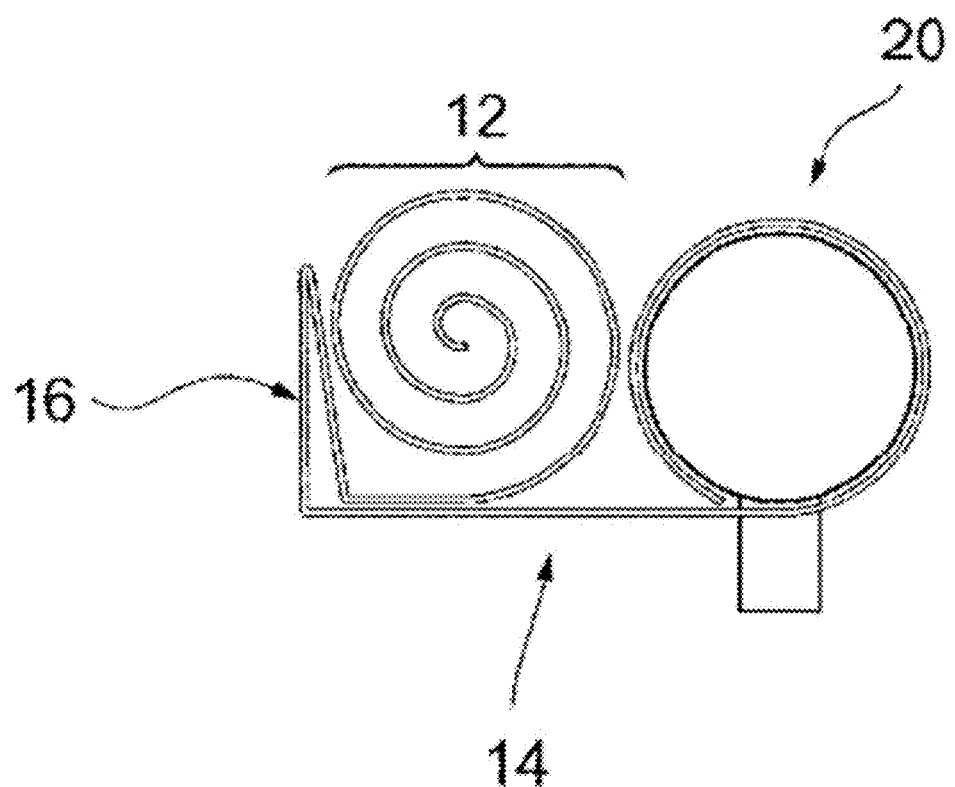
FIG. 14 is a plan view of an airbag in a state where a bent part is formed in addition to a roll-shaped overlapping part and a folded-back part.

It should be noted that, while the embodiment described above represents an example of a preferred embodiment of the present invention, the present invention is not limited to the embodiment described above and may be modified in various ways without departing from the spirit and scope of the invention. For example, while a case of forming the overlapping part 12 by accordion-folding a part of the airbag 10 in a zigzag manner is described in the embodiment presented above, this is simply a preferred example. Otherwise, the overlapping part 12 can be formed by winding a portion near the end part 10B of the airbag 10 in a roll shape (refer to FIGS. 12 to 14). Alternatively, although not particularly illustrated, the overlapping part 12 can also be formed by overlapping a part of the airbag 10 using a combination of folding and winding. In such a side airbag device 1, while a specific form of the overlapping part 12 may differ, a movement of the bent part 16 during expansion and deployment, a force acting on the overlapping part 12 due to the movement of the bent part 16, and the fact that, consequently, the entire airbag 10 becomes more readily deployable toward the outer side of the vehicle width direction are similar to the embodiment described above.

Figure 15:
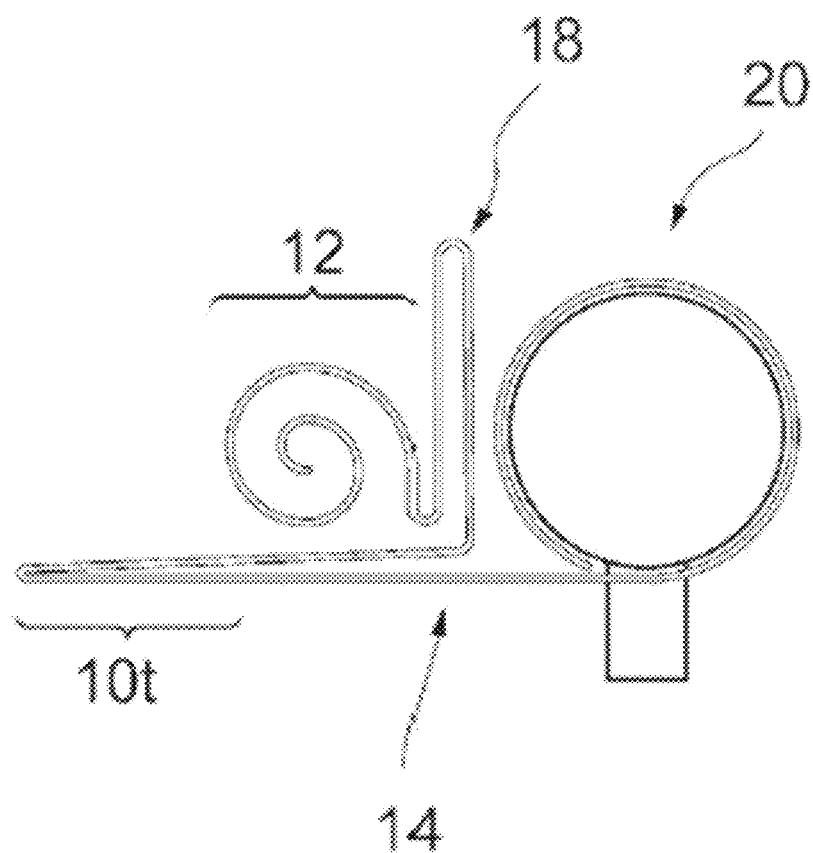
FIG. 15 is a plan view of an airbag in a state where a folded-back part and a second folded-back part are formed after a roll-shaped overlapping part is formed.
Figure 16:
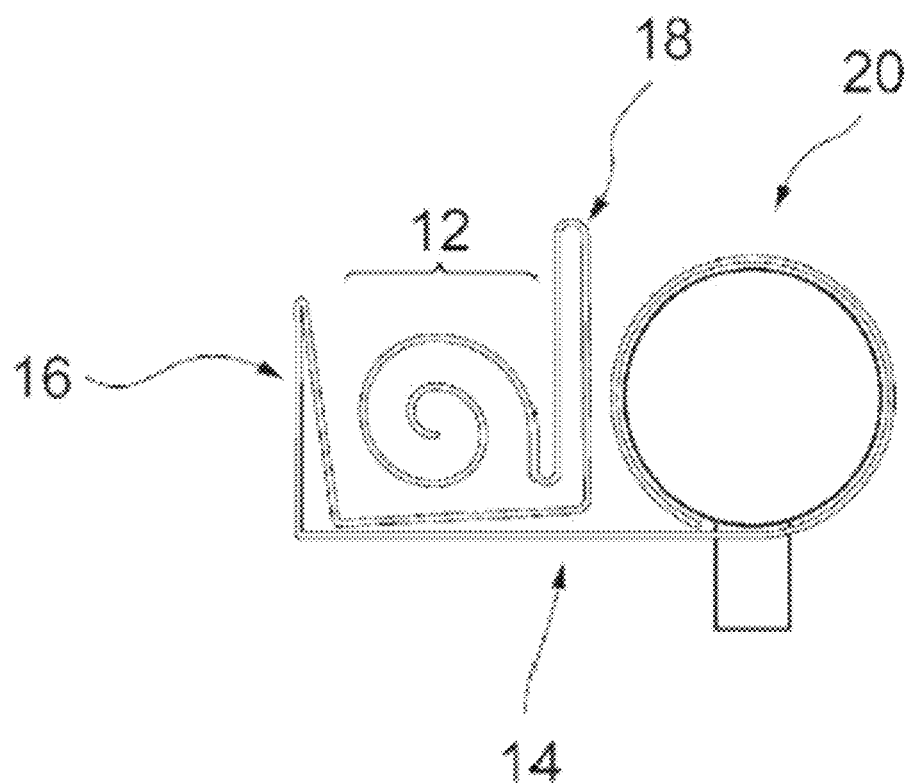
FIG. 16 is a plan view of an airbag in a state where a bent part is further formed after the state shown in FIG. 15.

In addition, in a case where the overlapping part 12 is formed by a roll part formed by rolling a portion near the end part 10B of the airbag 10 as described earlier, it is also favorable to form a second folded-back part 18 as an additional folded-back part between the overlapping part (the roll part) 12 and the folded-back part 14 (refer to FIGS. 15 and 16). As illustrated, the second folded-back part 18 is formed by being extended toward the outer side in the vehicle width direction and subsequently folded back toward the inner side in the vehicle width direction and is arranged on a vehicle rearward side of the overlapping part (the roll part) 12. The second folded-back part 18 formed in this manner assists quick deployment of a lower portion of the airbag 10 while pushing the overlapping part (the roll part) 12 toward the front of the vehicle during expansion and deployment of the airbag 10. In other words, when the overlapping part (the roll part) 12 is pushed toward the front of the vehicle by the second folded-back part 18, the lower portion of the airbag 10 which is folded back upward at a line of the lower edge 10L (refer to FIG. 3) becomes more readily deployable (becomes quickly deployable downward from the lower edge 10L in the state shown in FIG. 5). In addition, although not particularly illustrated, when there is a portion tucked into the folded-back part 14, the portion tucked into the folded-back part 14 can more readily emerge downward by removing the overlapping part 12 from the folded-back part 14.

A demonstration experiment performed using an occupant dummy of the side airbag device 1 configured as described in the embodiment presented above will now be described below as a practical example (refer to FIG. 17). Note that, since the present experiment was performed on a left seat, left and right are reversed from the embodiment, the drawings and the like described above.

The airbag 10 deployed toward the outer side in the vehicle width direction (in this case, the left side of the vehicle) and obliquely upward during expansion and deployment, and penetrated a gap between the vicinity of a shoulder and a door while flipping an arm (in this case, the left arm) of the occupant P obliquely upward during deployment. Specifically, a rate of forward movement of the airbag 10 below the arm of the occupant increased at 4 ms after start of deployment and, subsequently, the airbag 10 was able to penetrate between the shoulder of the occupant and the door at 6 ms. In addition, at this point, it was confirmed that the folded-back part 14 first expanded and pushed out the entire airbag 10 toward the vehicle outer side, the bent part 16 started expanding forward, and the overlapping part 12 next became undone as the entire airbag 10 expanded.

From the above, according to the side airbag device 1, it was confirmed that the vicinity of the shoulder of the occupant can be sufficiently protected by the airbag 10.

Figure 18:
FIG. 18 is an image showing, as a comparative example, a result of a demonstration experiment involving expanding and deploying an airbag of a conventional side airbag device.

A result of a demonstration experiment using a conventional side airbag device will be described as a comparative example. During the course of the experiment, the airbag sometimes got under an arm of the occupant during deployment and, as a result, a vicinity of a shoulder of the occupant was not sufficiently protected (refer to FIG. 18).

While the above description constitutes the preferred embodiment of the present invention, it will be appreciated that the invention is susceptible to modification, variation and change without departing from the proper scope and fair meaning of the accompanying claims.

The invention claimed is:

1. An airbag in a side airbag device including the airbag which is adapted to expand beside an occupant sitting in a seat of a vehicle and to deploy toward the front of the vehicle, and for use with an inflator which supplies an expansion gas from a base part of the airbag toward an end part of the airbag, comprising;
    before expanding and deploying, the airbag is in a folded state where the airbag comprises:
    an overlapping part formed by overlapping a portion of the airbag near the end part by accordion-folding or rolling or by a combination of folding and rolling;
    a folded-back part which is a portion continuing from the overlapping part to the base part and near the base part and which is formed at a position on an inner side of the overlapping part in a vehicle width direction by being extended in a direction toward the front of the vehicle and subsequently folded back in a direction toward the rear of the vehicle; and
    a bent part which is formed by bending a portion of the folded-back part, protruding from the overlapping part in the direction toward the front of the vehicle toward an outer side in the vehicle width direction, and which covers at least a part of the overlapping part on a vehicle front side of the overlapping part.

2. The airbag according to claim 1, further comprising the overlapping part is formed by being folded or wound from obliquely above with respect to a longitudinal direction of the inflator having a prescribed length in a vertical direction.

3. The airbag according to claim 2, further comprising the airbag is in a state where the overlapping part, the folded-back part, and the bent part are formed after an upper portion and a lower portion of the airbag in the vertical direction are obliquely folded.

4. The airbag according to claim 3, further comprising, after the upper portion and the lower portion of the airbag are folded, the airbag assumes a shape having an upper edge and a lower edge which are parallel to each other.

5. The airbag according to claim 4, further comprising the lower portion is in a state of being folded back at the lower edge.

6. The airbag according to claim 1, further comprising the folded-back part is a first folded-back part,
    the overlapping part is configured by a roll part formed by winding the portion near the end part, and
    a second folded-back part is formed between the roll part and the folded-back part and is arranged on a vehicle rear side of the roll part.

7. The airbag according to claim 6, further comprising the second folded-back part is formed by being extended toward the outer side in the vehicle width direction and subsequently folded back toward the inner side in the vehicle width direction.

8. A side airbag device comprising the airbag according to claim 1.

9. The airbag according to claim 1, further comprising the airbag when in the folded state having the airbag end part at a position forward in the vehicle direction from the remainder of the overlapping part.

10. A side airbag device comprising, an airbag which expands and deploys beside an occupant sitting in a seat of a vehicle toward the front of the vehicle, and an inflator which supplies an expansion gas from a base part of the airbag toward an end part of the airbag, wherein
    the airbag in a folded state before expanding and deploying includes:
    an overlapping part formed by accordion-folding a first portion of the airbag near the end part;
    a folded-back part which is a second portion of the airbag continuing from the overlapping part to the base part and which is formed on an inner side of the folded-back part in a vehicle width direction by being extended from the back part toward the front of the vehicle and subsequently folded back toward the rear of the vehicle; and
    a bent part which is formed by bending a portion of the folded-back part protruding beyond the overlapping part in a direction toward the front of the vehicle and toward a vehicle outer side, and which covers at least a portion of the overlapping part on a vehicle front side of the overlapping part.

11. A side airbag device comprising, an airbag which expands and deploys beside an occupant sitting in a seat of a vehicle toward the front of the vehicle, and an inflator which supplies an expansion gas from a base part of the airbag toward an end part of the airbag, comprising
   the airbag in a folded state before expanding and deploying includes:
   a folded-back part which is a portion of the airbag continuing from the base part and which is formed on an inner side in a vehicle width direction by being extended toward the front of the vehicle and subsequently folded back toward the rear of the vehicle,
   a bent part within the folded back part, the bent part extending in a direction outboard in the vehicle width direction, and
   an overlapping part extending from the folded-back part formed by accordion-folding or rolling a portion of the airbag near the end part; the overlapping part positioned on the outboard side of the folded-back part with the end part of the airbag positioned in a forward direction from a remainder of the overlapping part.

* * * * *